United States Patent
Wang

(10) Patent No.: US 7,200,559 B2
(45) Date of Patent: Apr. 3, 2007

(54) SEMANTIC OBJECT SYNCHRONOUS UNDERSTANDING IMPLEMENTED WITH SPEECH APPLICATION LANGUAGE TAGS

(75) Inventor: Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 10/448,018

(22) Filed: May 29, 2003

(65) Prior Publication Data

US 2004/0243393 A1 Dec. 2, 2004

(51) Int. Cl.
 *G06F 17/28* (2006.01)
(52) U.S. Cl. .......................................... 704/257; 704/9
(58) Field of Classification Search .................... 704/9, 704/257, 270, 275
See application file for complete search history.

(56) References Cited

U.S. PATENT DOCUMENTS

| | | | |
|---|---|---|---|
| 4,831,550 A | 5/1989 | Katz | 364/513.5 |
| 4,945,566 A | 7/1990 | Mergel et al. | 381/41 |
| 4,947,438 A | 8/1990 | Paeseler | 381/43 |
| 5,263,117 A | 11/1993 | Nadas et al. | 395/2 |
| 5,384,892 A | 1/1995 | Strong | 395/2.52 |
| 5,477,451 A | 12/1995 | Brown et al. | 364/419.08 |
| 5,502,774 A | 3/1996 | Bellegarda et al. | 382/159 |
| 5,615,296 A | 3/1997 | Stanford et al. | 395/2.1 |
| 5,621,809 A | 4/1997 | Bellegarda et al. | 382/116 |
| 5,680,511 A | 10/1997 | Baker et al. | 395/2.66 |
| 5,689,617 A | 11/1997 | Pallakoff et al. | 395/2.64 |
| 5,710,866 A | 1/1998 | Alleva et al. | 704/256 |
| 5,752,052 A | 5/1998 | Richardson et al. | 395/759 |
| 5,765,133 A | 6/1998 | Antoniol et al. | 704/355 |
| 5,819,220 A | 10/1998 | Sarukkai et al. | 704/243 |
| 5,829,000 A | 10/1998 | Huang et al. | 704/252 |
| 5,835,888 A | 11/1998 | Kanevsky et al. | 704/9 |
| 5,899,973 A | 5/1999 | Bandara et al. | 704/256 |
| 5,905,972 A | 5/1999 | Huang et al. | 704/268 |

(Continued)

FOREIGN PATENT DOCUMENTS

EP 0 645 757 A1 3/1995

(Continued)

OTHER PUBLICATIONS

Communication pursuant to Article 96(2) EPC, Application No. 04011317.7-2218, dated Jun. 1, 2005, 3 pages.

(Continued)

*Primary Examiner*—Abul K. Azad
(74) *Attorney, Agent, or Firm*—Steven M. Koehler; Westman, Champlin & Kelly P.A.

(57) ABSTRACT

A speech understanding system includes a language model comprising a combination of an N-gram language model and a context-free grammar language model. The language model stores information related to words and semantic information to be recognized. A module is adapted to receive input from a user and capture the input for processing. The module is further adapted to receive SALT application program interfaces pertaining to recognition of the input. The module is configured to process the SALT application program interfaces and the input to ascertain semantic information pertaining to a first portion of the input and output a semantic object comprising text and semantic information for the first portion by accessing the language model, wherein performing recognition and outputting the semantic object are performed while capturing continues for subsequent portions of the input.

10 Claims, 7 Drawing Sheets

U.S. PATENT DOCUMENTS

| | | | |
|---|---|---|---|
| 5,913,193 A | 6/1999 | Huang et al. | 704/258 |
| 5,937,384 A | 8/1999 | Huang et al. | 704/256 |
| 5,963,903 A | 10/1999 | Hon et al. | 704/254 |
| 6,073,091 A | 6/2000 | Kanevsky et al. | 704/9 |
| 6,081,799 A | 6/2000 | Beavin et al. | 702/2 |
| 6,141,641 A | 10/2000 | Hwang et al. | 704/243 |
| 6,154,722 A | 11/2000 | Bellegarda | 704/257 |
| 6,157,912 A | 12/2000 | Kneser et al. | 704/270 |
| 6,167,398 A | 12/2000 | Wyard et al. | 707/5 |
| 6,182,039 B1 | 1/2001 | Rigazio et al. | 704/257 |
| 6,188,976 B1 | 2/2001 | Ramaswamy | 704/9 |
| 6,567,778 B1 | 5/2003 | Chang et al. | 704/257 |
| 7,016,830 B2 * | 3/2006 | Huang et al. | 704/9 |
| 2002/0042711 A1 * | 4/2002 | Lin | 704/257 |

FOREIGN PATENT DOCUMENTS

| | | |
|---|---|---|
| EP | 0 687 987 A1 | 12/1995 |
| EP | 1 199 630 A2 | 4/2002 |
| EP | 1199630 A | 4/2002 |
| WO | WO 96/41333 | 12/1996 |
| WO | WO 98/34180 | 8/1998 |
| WO | WO 01/93249 A | 12/2001 |

OTHER PUBLICATIONS

Communication with European Search Report dated Oct. 7, 2004, Application No. 04011317.7-2218, 4 pages.

Wang K: "Salt: A spoken language interface for web-based multimodal dialog systems" Proceedings of ICSLP 2002, International Conference on Spoken Language Processing, Sep. 16, 2002, pp. 2241-2244.

Ye-Yi Wang, et al: "A unified context-free grammar and n-gram model for spoken language processing" Proc. of IEEE ICASSP 2000, vol. 3, Jun. 5, 2000, pp. 1639-1642.

Combination of Statistical and Rule-Based Approaches for Spoken Language Understanding Ye-Yi Wang, Alex Acero, Ciprian Chelba, Brendan Frey* and Leon Wong Microsoft Research, One Microsoft Way, Redmond, Washington 98052, USA Electrical and Computer Engineering, University of Toronto.

Kuansan Wang: "Semantic modeling for dialog systems in a pattern recogntion framework" Proceedings of Automatic Speech Recognition and Understanding Workshop ASRU, Dec. 9, 2001, pp. 284-287.

Dialogue speech recognition using syntactic rules based on subtrees and preterminal bigrams, Takezawa, Toshiyuki; Morimoto, Tsuyoshi Systems and Computers in Japan. vol. 28, No. 5, pp. 22-32. 1997.

Wang K: "Semantic object synchronous understanding in SALT for highly interactive user interface" Proceedings of Eurospeech 2003, 8TH European Conference on Speech Communication and Technology, Sep. 1, 2003, pp. 1209-1212.

Speech Application Language Tags Specification, Jul. 15, 2002, pp. 1-112.

Daniele Falavigna, Roberto Gretter: "Flexible Mixed Initiative Dialogue over the Telephone Network", in Proceedings of ASRU 99, Keystone, Colorado, Dec. 12-15, 1999.

Goodman, J.T., "Putting It All Together: Language Model Combination," Acoustics, Speech, and Signal Processing, 2000. ICASSP '00 Inern'l Conf. On, v. 3, pp. 1647-1650.

Wang, Ye-Yi et al., "Unified Context-Free Grammar and N-Gram Model for Spoken Language Processing," Acoustics, Speech, and Signal Processing, 2000 IEEE Intern'l Conf. On, v. 3, pp. 1639-1642.

Tsukada, H. et al., "Reliable Utterance Segment Recognition by Integrating a Grammar with Statistical Language Constraints," Speech Communications, Elsevier Science Publishers, Dec. 1998, vol. 26, No. 4, pp. 299-309.

Moore, R., "Using Natural-Language Knowledge Sources in Speech Recognition," Computational Models of Speech Pattern Processing, Proceedings of Computational Models of Speech Pattern Processing, Jul. 1997, pp. 304-327.

Database Inspec 'Online!, Institute of Electrical Engineers, "Improvement of a Probabilistic CFG Using a Cluster-Based language Modeling Technique," & "Methodologies for the Conception, Design, and Application of Intelligent Systems," Abstract, 1996.

Lloyd-Thomas, H., et al., "An Integrated Grammar/Bigram Language Model Using Path Scores," Proceedings of the International Conference on Acoustics, Speech and Signal Processing, May 9, 1995, vol. 1, pp. 173-176.

Mergel, A. et al., "Construction of Language Models for Spoken Database Queries", IEEE, 1987, pp. 844-847.

Ward, W., "Understanding Spontaneous Speech: The Phoenix System", Proceedings ICASSP, 1991, pp. 365-367.

Matsunaga et al., "Task Adaptation in Stochastic Language Models for Continuous Speech Recognition", IEEE Mar. 23, 1992, pp. I-165-I-168.

Moore, R., et al., "Combining Linguistic and Statistical Knowledge Sources in Natural-Language Processing for ATIS", in Proceedings of the ARPA Spoken Language Systems Technology Workshop, 1995, Morgan Kaufmann, Los Altos, CA; Austin, Texas.

PJ Wyard et al., "Spoken Language Systems-Beyond Prompt and Response", BT Technology Journal, Jan. 1996, No. 1, pp. 187-205.

Huang, X., et al., "From Sphinx II to Whisper: Making Speech Recognition Usable, in Automatic Speech and Speaker Recognition", C.H. Lee, F.K. Soong, and K.K. Paliwal, Editors, 1996, Klewer Academic Publishers: Norwell, MA., pp. 481-508.

"Implications of the Perplexity Definition", Eagles Handbook of Standards and Resources for Spoken Language Systems, Online!, May 1997.

Kneser et al., "Semantic Clustering for Adaptive Language Modelling", IEEE, 1997, pp. 779-782.

Masataki et al., "Task Adaptation Using Map Estimation in N-gram Language Modeling", IEEE, 1997, pp. 783-786.

Niesler et al., "Modelling Word-Pair Relations in a Category-Based Language Model", IEEE, 1997, pp. 795-798.

Bellegarda, J., "A Statistical Language Modeling Approach Integrating Local and Global Constraints", IEEE, 1997, pp. 262-269.

Jelinek et al., "Putting Language into Language Modeling", Proceedings of Eurospeech 1999, pp. 1-5.

Seneff, S., "The Use of Linguistic Hierarchies in Speech Understanding", in ICSLP, 1998, Sydney, Australia.

Gillett, J. and W. Ward, "A Language Model Combining Trigrams and Stochastic Context-Free Grammars", in ICSLP, 1998, Sydney, Australia.

Galescu, L., E.K. Ringger, and J. Allen, "Rapid Language Model Development for New Task Domains", in Proceedings of the ELRA First International Conference on Language Resources and Evaluation (LREC), 1998, Granada, Spain.

Nasr, A., et al., "A Language Model Combining N-grams and Stochastic Finite State Automata", in Eurospeech, 1999.

Wang, Y. -Y., "A Robust Parser for Spoken Language Understanding", in Eurospeech, 1999, Hungary.

Wang, K., "An Event Driven Model for Dialogue Systems", in ICSLP, 1998, Sydney Australia.

Mahajan, M., D. Beeferman, and X.D. Huang, "Improved Topic-Dependent Language Modeling Using Information Retrieval Techniques", in ICASSP, 1999, Phoenix, AZ., USA.

Ward et al., "Flexible Use of Semantic Constraints In Speech Recognition", Acoustics, Speech, and Signal Processing, 1993. ICASSP-93., 1993 IEEE International Conference on, vol. 2, Apr. 27-30, 1993, pp. 49-50.

V. Zue, et al., "Jupiter: A telephone-based conversational interface for weather information," *IEEE Trans. Speech and Audio Processing*, 8(1), Jan. 2000.

B. Souvignier, et al., "The thoughtful elephant,: strategies for spoken dialog systems." *IEEE Trans. Speech and Audio Processing*, 8(1), Jan. 2000.

A. Gorin, et al., "How may I help you?" *Speech Comm.*, vol. 23, pp. 113-127, 1997.

R. Sato, et al., "Learning decision trees to determine turn-taking by spoken dialog systems," in *Proc. ICSLP-2002*, Denver, Co., Sep. 2002.

L. Ferrer, et al., "Is the speaker done yet? Faster and more accurate end-of-utterance detection using prosody," in *Proc. ICSLP-2002*, Denver Co., Sep. 2002.

Q. Li, et al., "A robust real-time endpoint detector with energy normalization," in *Proc. ICASSP-2001*, vol. 1, Salt Lake City, UT, May 2001.

L. Huang, C. Yang, "A novel approach to robust speech endpoint detection in car environments," in *Proc. ICASSP-2000*, vol. 3, Istanbul, Turkey, Jun. 2000.

N. Sawhney, C. Schmandt, "Nomad radio: speech and audio interaction for contextual messaging in nomadic environments," *ACM Trans. Computer-Human Interaction*, 7(3), pp. 353-383, Sep. 2000.

A. Rudnicky, et al., "SpeechWear: a mobile speech system," in *Proc. ICSLP-96*, Philadelphia, PA., Oct. 1996.

X. Huang, et al., "MiPad: A next generation PDA prototype," in *Proc. ICSLP-2000*, Beijing, China, Oct. 2000.

S. L. Oviatt, "Multimodal interactive maps: designing for human performance." *Human Computer Interactions*, vol. 12, pp. 93-129, 1997.

M. A. Walker, et al., "DARPA Communicator Evaluation: Progress from 2000 to 2001," in *Proc. ICSLP-2002*, Denver, Co., Sep. 2002.

M. A. Walker, et al., "PARADISE: A framework for evaluating spoken dialog systems," in *Proc. 35th ACL*, 1997.

L. Bell, J. Gustafson, "Positive and negative user feedback in spoken dialog corpus," in *Proc. ICSLP-2000*, Beijing, China, Oct. 2000.

L. Cerrato, "A comparison between feedback strategies in human-to-human and human-machine communication," in *Proc. ICSLP-2002*, Denver, Co., Sep. 2002.

K. Wang, "A plan based dialog system with probabilistic inferences", in *Proc. ICSLP-2000*, Beijing China, 2000.

M. Mohri, et al., "Weighted automata in text and speech processing," in *Proc. ECAI-96 Workshop*, Budapest, Hungary, 1996.

H. Ney, S. Ortmanns, "Dynamic programming search for continuous speech recognition," *IEEE Signal Processing Magazine*, pp. 64-83, 1999.

C. Chelba, "A structured language model," in *Proc. EACL-97*, Madrid, Spain, Jul. 1997.

K. Wang, "Natural language enabled Web applications," in *Proc. 1st NLP and XML Workshop*, Tokyo, Japan, Nov. 2001.

XSL Transformations, http://www.w3.org/TR/xslt.

Salt Speech Application Language Tags (SALT) 1.0 Specification, Jul. 15, 2002, Cisco Systems, Inc., Comverse Inc., Intel Corporation, Microsoft Corporation, Philips Electronics N.V., SpeechWorks International Inc., 2002.

K. Wang, http://www.w3org/voice/group/2000/ms-SemanticTag.html.

* cited by examiner

SEMANTIC OBJECT SYNCHRONOUS UNDERSTANDING IMPLEMENTED WITH SPEECH APPLICATION LANGUAGE TAGS

BACKGROUND OF THE INVENTION

The present invention relates to access and rendering of information in a computer system. More particularly, the present invention relates to access of information using recognition and understanding.

Recently, technology has been advanced to allow the user to access information on a computer system by providing speech commands. Upon receipt of a user command, the computer system performs speech recognition on the user input and further processes the input in order to ascertain the intent of the user in order that the computer system will perform a desired action.

In some situations, the input provided by the user is incomplete or indefinite, which will require the computer system to solicit further information from the user either in the form of visual or audible prompts. A dialog can thus be established between the user and the computer system, where each takes turns providing questions, answers and/or acknowledgments until the intent of the user is ascertained and an action can be performed. In other situations, creating such a dialog is the preferred mode for interacting with the computer system.

Speech Application Language Tags (SALT) has been introduced to facilitate speech as a viable input/output modality for modern user interface design. The design goal for SALT is to make common speech tasks simple to program, yet allow advanced capabilities with straightforward realization. SALT was designed for many applications. One being, for example, a telephone-based, speech-only application that only interacts with users exclusively through spoken dialogue.

SALT includes speech input and output objects ("listen" and "prompt"), which have a mode design to incorporate technologies to detect the start and the end of the user's turn. Accordingly, many speech applications employ user interfaces that require the user to signal the start of a user turn. Some computer systems include wearable computers, speech enabled modal or multimodal (speech input provided for fields selected by an input device such as a mouse) devices and other eyes-free applications. Nevertheless, in each of these environments, a clean cut definition on the user versus computer system turn in the dialog is still present.

Human conversation however does not generally follow a clean cut, turn-taking dialog between participants. Rather, conversations can include acknowledgements, confirmations, questions by one participant, etc., while the other is providing information that may drastically affect, slightly affect or not even affect the manner in which the speaker is providing information. Human speakers enjoy this natural form of conversation. Likewise, telephone systems employ full duplex technology in order to allow such conversations to take place.

In contrast, dialogue based interfaces employ a rigid turn-taking mode of operation between a user and a computer system, which causes the computer system to wait for the end of the user dialog before processing and taking subsequent action. Although simple feedback, such as visual indications like a series of dots progressing across a computer screen, may provide the user some assurance that the computer system is at least processing something, until the user finishes his/her turn and the computer system responds, the extent of understanding by the computer system is not known.

Accordingly, there is a need for improvements in a computer systems that is based on recognition and understanding. Such improvements would provide a system or method for accessing information that would be easier to use by being more natural for the user.

SUMMARY OF THE INVENTION

A method and system provide a speech input mode which dynamically reports partial semantic parses, while audio captioning is still in progress. The semantic parses can be evaluated with an outcome immediately reported back to the user.

In one aspect, a speech understanding system includes a language model comprising a combination of an N-gram language model and a context-free grammar language model. The language model stores information related to words and semantic information to be recognized. A module is adapted to receive input from a user and capture the input for processing. The module is further adapted to receive SALT application program interfaces pertaining to recognition of the input. The module is configured to process the SALT application program interfaces and the input to ascertain semantic information pertaining to a first portion of the input and output a semantic object comprising text and semantic information for the first portion by accessing the language model, wherein performing recognition and outputting the semantic object are performed while capturing continues for subsequent portions of the input.

DETAILED DESCRIPTION OF ILLUSTRATIVE EMBODIMENTS

Figure 1:
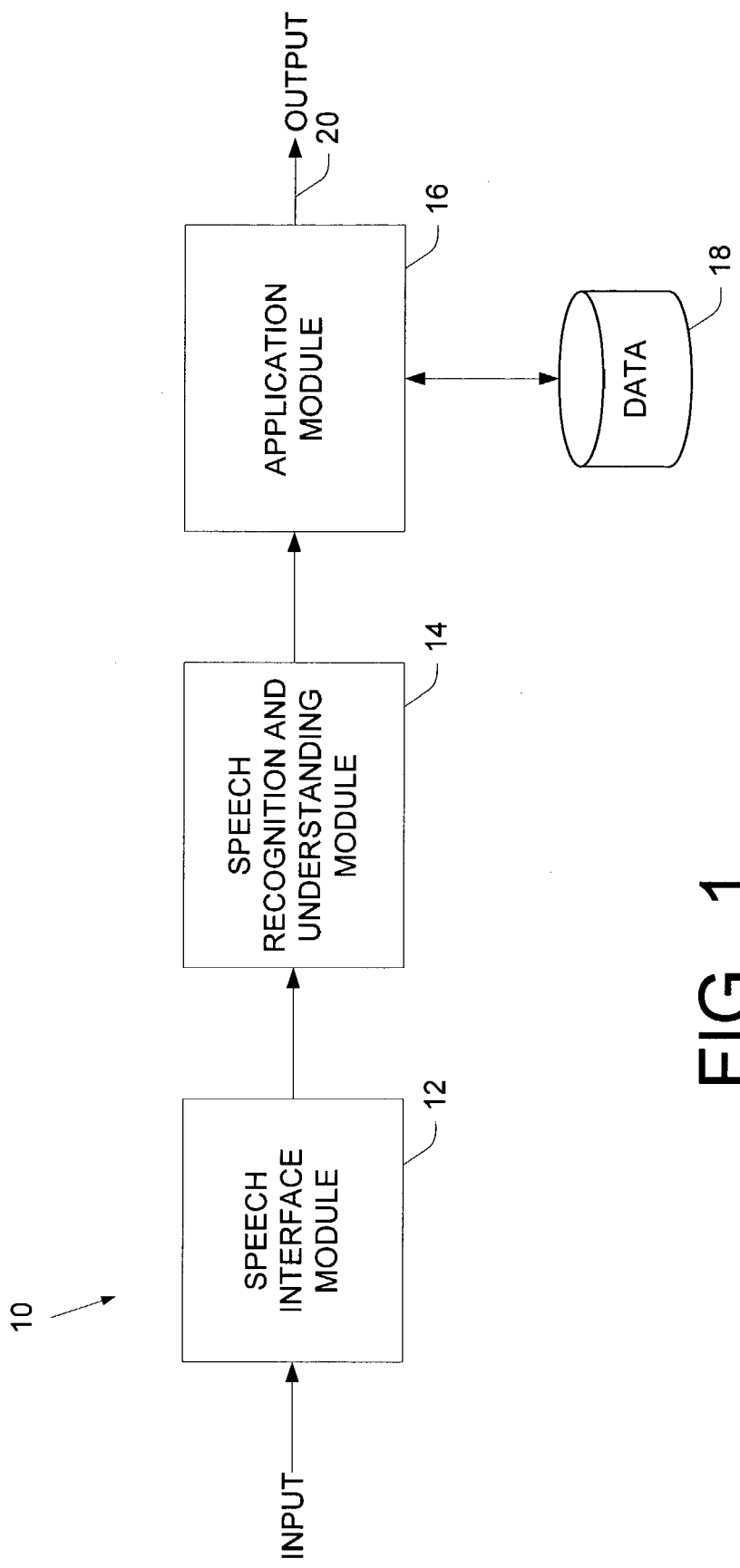
FIG. 1 is a block diagram of a data presentation system.

FIG. 1 is a block diagram of a data presentation system 10 for rendering data based on voice input. System 10 includes a speech interface module 12, a speech recognition and understanding module 14 and a data rendering module 16. A user provides input in the form of a voice query to speech interface module 12. Speech interface module 12 gathers speech information from a user and provides a signal indicative thereof. After the input speech has been gathered by speech interface module 12, speech recognition and understanding module 14 recognizes the speech using a speech recognizer and also performs speech understanding, wherein in one aspect of the present invention, provides partial semantic parses of the input so far received, while audio speech input is still being captured.

The partial semantic parses, which typically include the text for the input received (or other data indicative of the text of the input), but also ascertained semantic information, are provided to an application module 16 that can take many different forms. For instance, in one embodiment, the application module 16 can be a personal information manager that is used to send, receive and reply to e-mails, arrange meetings and the like. In this manner, the user can provide audible commands to perform these tasks. More importantly though, the application module 16 can provide interactive feedback and/or take actions on the partial semantic parses information as it is received, thereby providing the user with a highly interactive interface for the application module 16. For example, in a voice only mode of operation, an output 20 can include audible statements back to the user, while, of course, possibly performing other tasks related to the application. The partial semantic parses or semantic objects can be used to execute dialog logic in the application. For instance, the dialog logic can present an option, or a plurality or list of options, to the user based on one or more semantic objects.

This enables the system 10 to immediately report outcomes based on a partial utterance, namely, before the user turn has ended. In other words, by using back channel communication to report and perform tasks normally associated with a system turn, the definition of a user and a system turn is blurred. Most conventional dialog studies, especially those based on human to human dialogs, often view the back channel communications as non-intrusive feedback that conveys only simple signals such as positive, negative, or neutral acknowledgement. However, the feedback provided by output 20 can potentially carry more information so as to be somewhat intrusive to the ongoing user utterance, which may or may not cause the user to clarify the user's intention or direction. Nevertheless, this approach provides a more realistic human dialog between the user and the system 10, which in many cases will not be considered annoying, but rather be more comfortable to the user and instill confidence that the user's desires will be met.

At this point it should be noted that the present invention is not limited to a voice-only operating environment, but rather can include other forms of feedback to the user based on processing of partial semantic parses or objects. For example, in the application discussed above where the application module 16 performs e-mail tasks, the output 20 can include visual feedback such as activating an e-mail module based only on receipt of a phrase such as "Send e-mail" in an uninterrupted command from the user comprising "Send e-mail to Bob", where processing of the phrase "to Bob", may cause the application module to access further information in data store 18 and render a list of people having the first name "Bob". Whereupon seeing the list, the user simply identifies the intended recipient as "Bob Green", which can then be selected because the system would have provided another semantic object for the partial utterance "Bob Green", which upon receipt by the application and processed would cause "Bob Green" to be selected.

As indicated above, the application module 16 can take many forms where aspects of the present invention discussed further below may be beneficial. Without limitation, the application module 16 can also be a dictation module to provide a textual output of the user's spoken input. However, by processing semantic information for partial input or phrases of input as well, a more accurate transcription can be obtained.

Although described above with respect to an input from the user comprising voice commands, aspects of the present invention can also be applied to other forms of input such as handwriting, DTMF, gesture or visual indications.

Given the broad applicability of processing partial semantic parses or objects, it may be useful to describe generally computing devices that can function in system 10 described above. As appreciated by those skilled in the art, the components of system 10 may be located within a single computer or distributed across a distributed computing environment using network connections and protocols.

Figure 2:
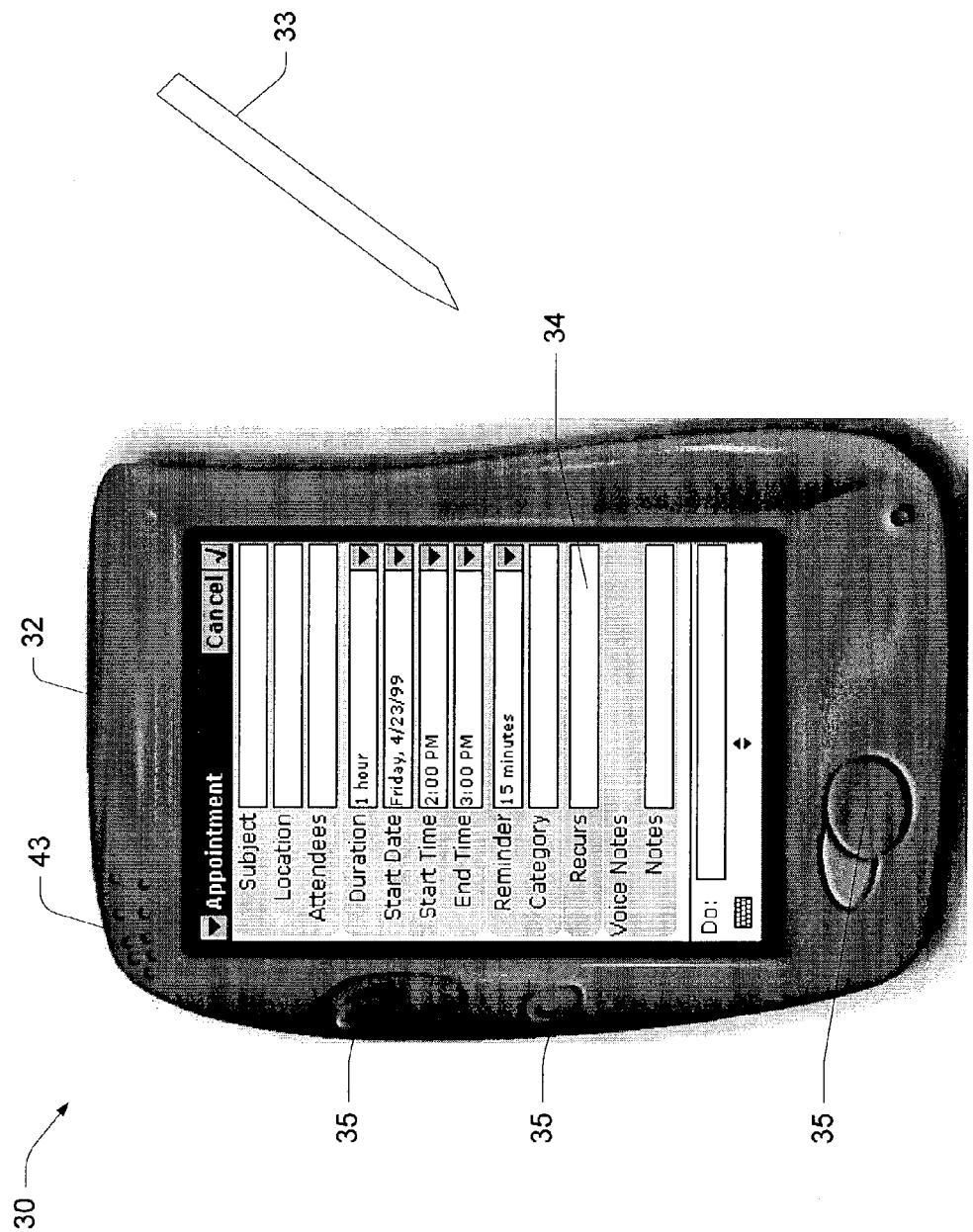
FIG. 2 is a plan view of a computing device operating environment.

Referring now to FIG. 2, an exemplary form of a mobile device such as a data management device (PIM, PDA or the like) is illustrated at 30. However, it is contemplated that the present invention can also be practiced using other computing devices discussed below. For example, phones and/or data management devices will also benefit from the present invention. Such devices will have an enhanced utility compared to existing portable personal information management devices and other portable electronic devices.

In the exemplary form of a data management mobile device 30 is illustrated in FIG. 2, the mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 3:
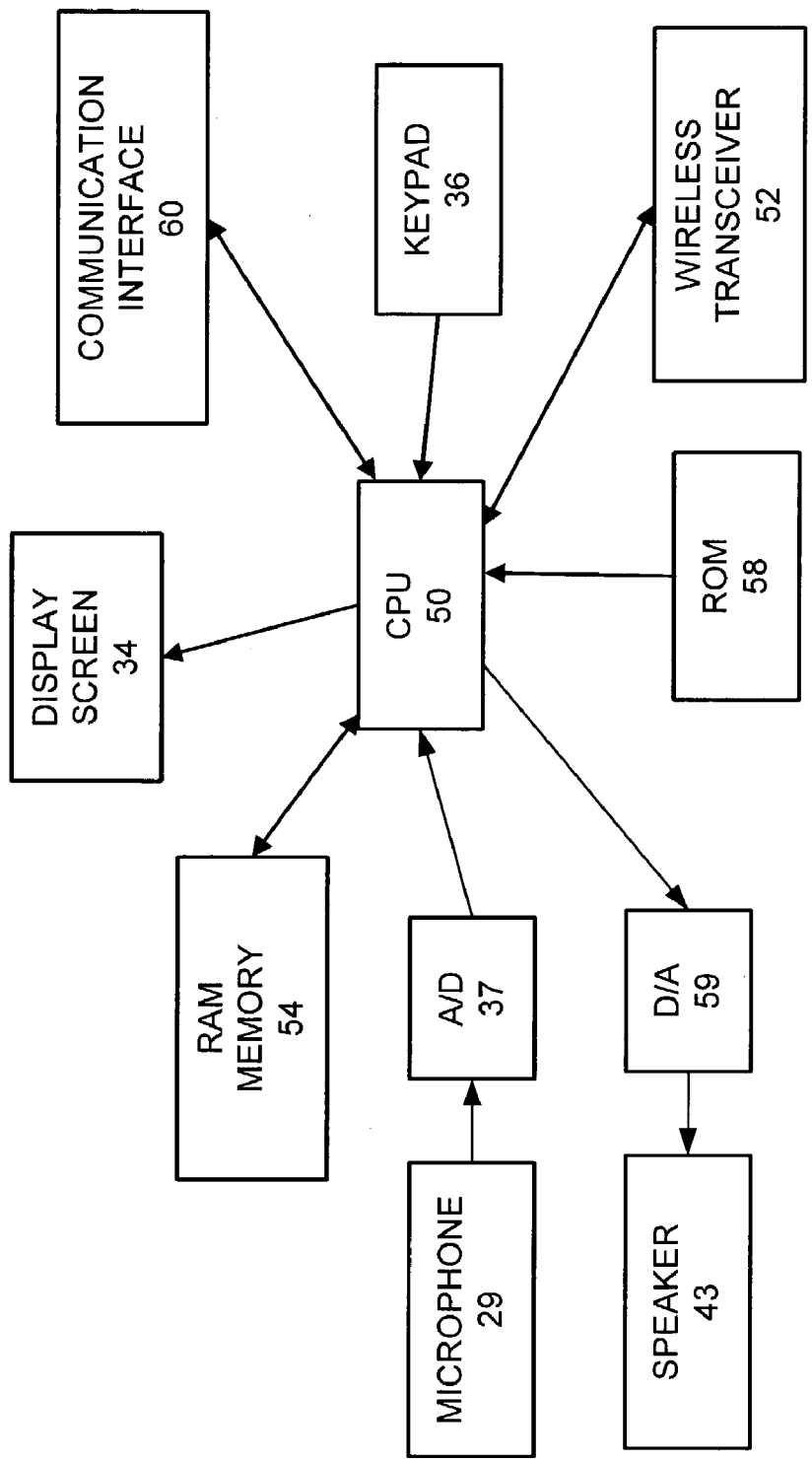
FIG. 3 is a block diagram of the computing device of FIG. 2.

Referring now to FIG. 3, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile device 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data can be transmitted to a remote recognition server 204 discussed below and illustrated in the architecture of FIG. 6. Recognition results can then be returned to mobile device 30 for rendering (e.g. visual and/or audible) thereon, and eventual transmission to a web server 202 (FIG. 6), wherein the web server 202 and mobile device 30 operate in a client/server relationship.

Similar processing can be used for other forms of input. For example, handwriting input can be digitized with or without pre-processing on device 30. Like the speech data, this form of input can be transmitted to the recognition server 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

Figure 4:
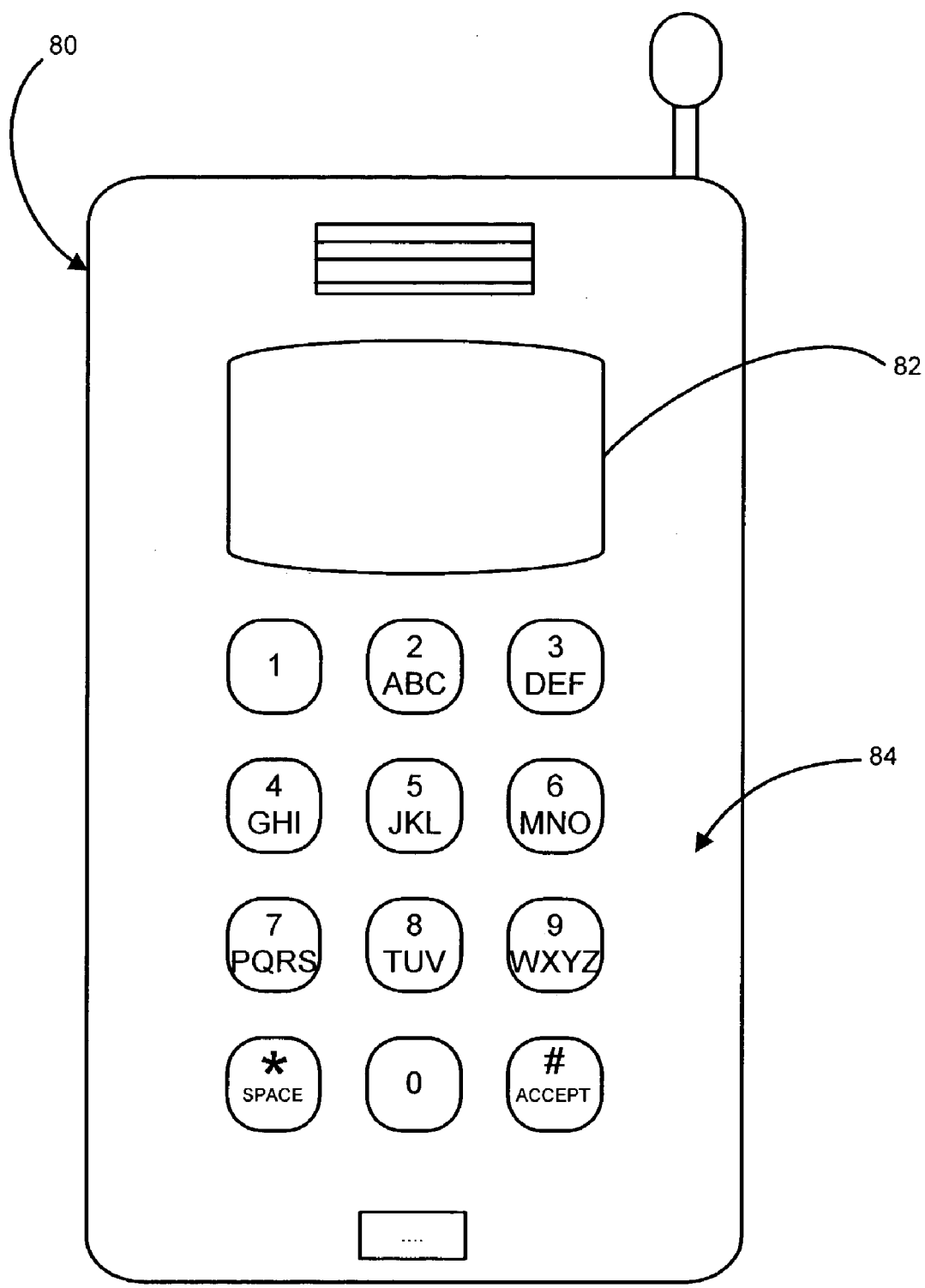
FIG. 4 is a plan view of a telephone.

FIG. 4 is a plan view of an exemplary embodiment of a portable phone 80. The phone 80 includes a display 82 and a keypad 84. Generally, the block diagram of FIG. 3 applies to the phone of FIG. 4, although additional circuitry necessary to perform other functions may be required. For instance, a transceiver necessary to operate as a phone will be required for the embodiment of FIG. 3; however, such circuitry is not pertinent to the present invention.

In addition to the portable or mobile computing devices described above, it should also be understood that the present invention can be used with numerous other computing devices such as a general desktop computer. For instance, the present invention will allow a user with limited physical abilities to input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, tablet computers, multiprocessor systems, microprocessor-based systems, set top boxes, programmable consumer electronics, network PCs, minicomputers, mainframe computers, distributed computing environments that include any of the above systems or devices, and the like.

Figure 5:
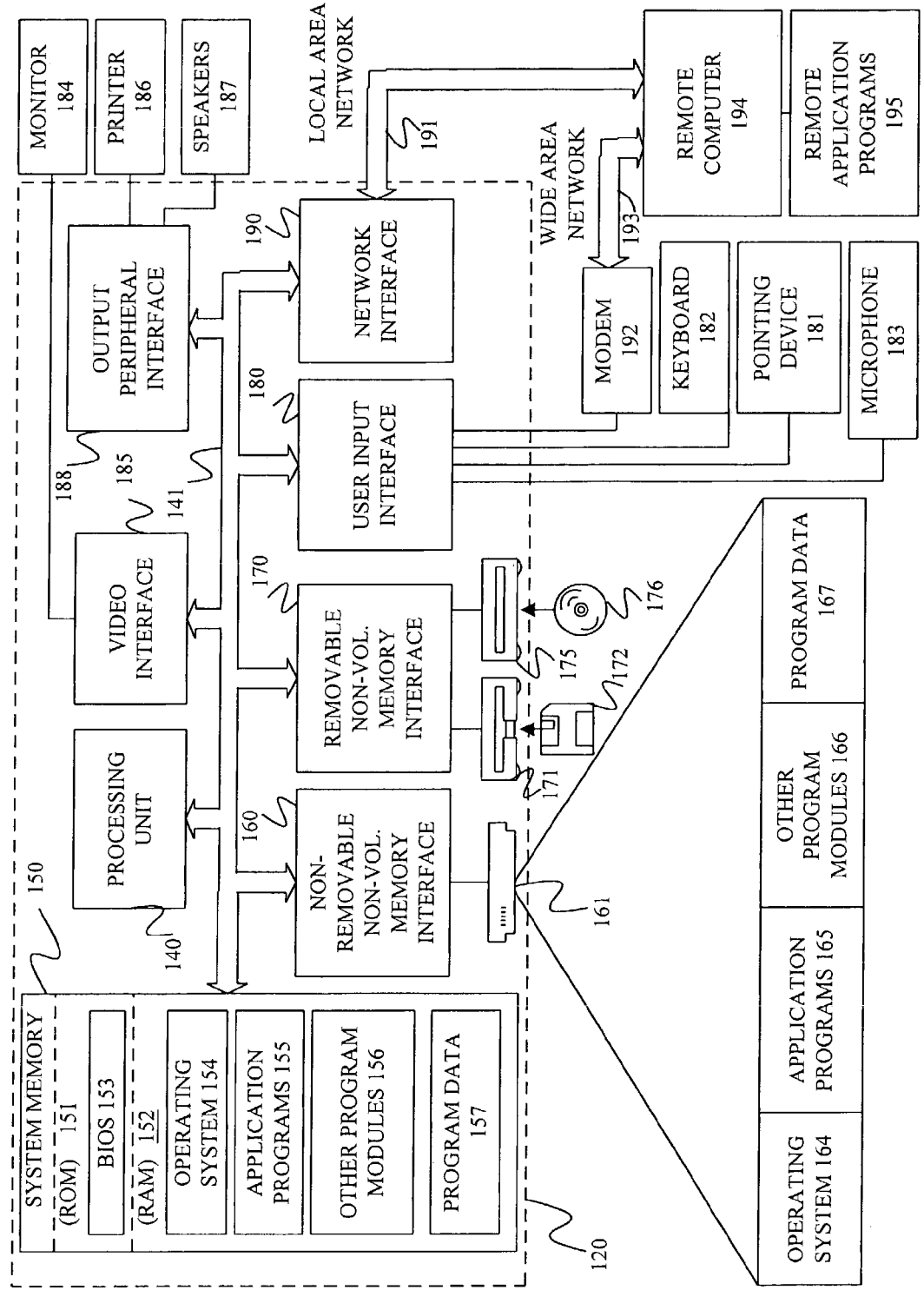
FIG. 5 is a block diagram of a general purpose computer.

The following is a brief description of a general purpose computer 120 illustrated in FIG. 5. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 5, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 5 illustrates operating system 154, application programs 155, other program modules 156, and program data 157.

The computer 120 may also include other removable/non-removable volatile/nonvolatile computer storage media. By way of example only, FIG. 5 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 5, provide storage of computer readable instructions, data structures, program modules and other data for the computer 120. In FIG. 5, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 5 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 5 illustrates remote application programs 195 as residing on remote computer 194. It will be appreciated that the network connections shown are exemplary and other means of establishing a communications link between the computers may be used.

Figure 6:
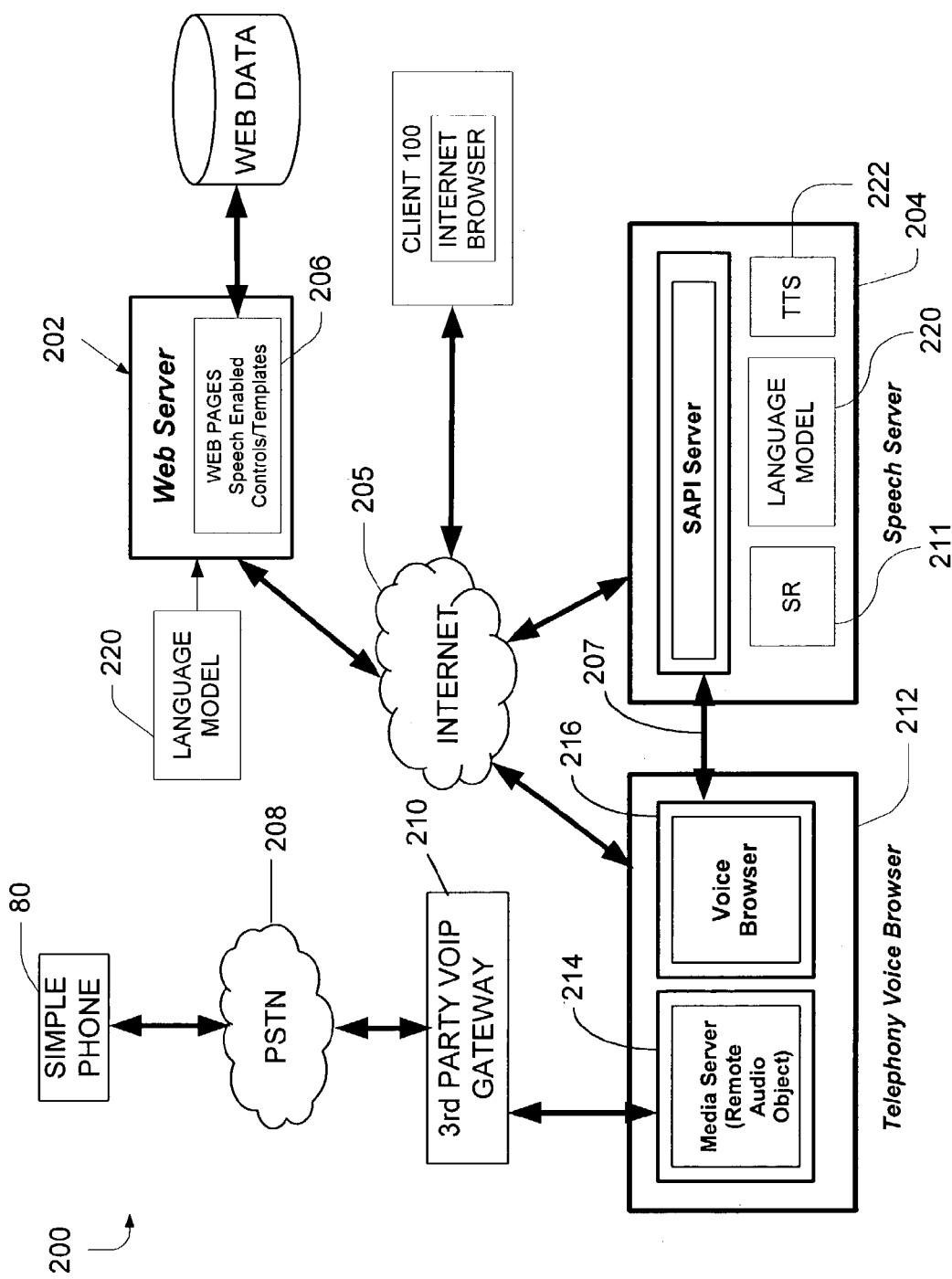
FIG. 6 is a block diagram of an architecture for a client/server system.

FIG. 6 illustrates architecture 200 for web based recognition and data rendering, which is one exemplary environment for the present invention. Generally, information stored in a web server 202 can be accessed through a client 100 such as mobile device 30 or computer 120 (which herein represent other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

In this embodiment, architecture 200 is unified in that whether information is obtained through client 100 or phone 80 using speech recognition, a single recognition server 204 can support either mode of operation. In addition, architecture 200 operates using an extension of well-known mark-up languages (e.g. HTML, XHTML, cHTML, XML, WML, and the like). Thus, information stored on web server 202 can also be accessed using well-known GUI methods found in these mark-up languages. By using an extension of well-known mark-up languages, authoring on the web server 202 is easier, and legacy applications currently existing can be also easily modified to include voice recognition.

Generally, client 100 executes HTML pages, scripts, or the like, generally indicated at 206, provided by web server 202 using a browser. When voice recognition is required, by way of example, speech data, which can be digitized audio signals or speech features wherein the audio signals have been preprocessed by client 100 as discussed above, are provided to recognition server 204 with an indication of a grammar or language model 220 to use during speech recognition, which may be provided by client 100. Alternatively, speech server 204 may include the language model 220. The implementation of the recognition server 204 can take many forms, one of which is illustrated, but generally includes a recognizer 211. The results of recognition are provided back to client 100 for local rendering if desired or appropriate. If desired, text-to-speech module 222 can be used to provide spoken text to client 100. Upon compilation of information through recognition and any graphical user interface if used, client 100 sends the information to web server 202 for further processing and receipt of further HTML pages/scripts, if necessary.

As illustrated in FIG. 6, client 100, web server 202 and recognition server 204 are commonly connected, and separately addressable, through a network 205, herein a wide area network such as the Internet. It therefore is not necessary that any of these devices be physically located adjacent each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. Web server 202 can also include an authoring mechanism that can dynamically generate client-side markups and scripts. In a further embodiment, the web server 202, recognition server 204 and client 100 may be combined depending on the capabilities of the implementing machines. For instance, if the client 100 comprises a general purpose computer, e.g. a personal computer, the client may include the recognition server 204. Likewise, if desired, the web server 202 and recognition server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephony voice browser 212 includes a media server 214 that provides a telephony interface and a voice browser 216. Like client 100, telephony voice browser 212 receives HTML pages/scripts or the like from web server 202. In one embodiment, the HTML pages/scripts are of the form similar to HTML pages/scripts provided to client 100. In this manner, web server 202 need not support client 100 and phone 80 separately, or even support standard GUI clients separately. Rather, a common mark-up language can be used. In addition, like client 100, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 5.

Figure 7:
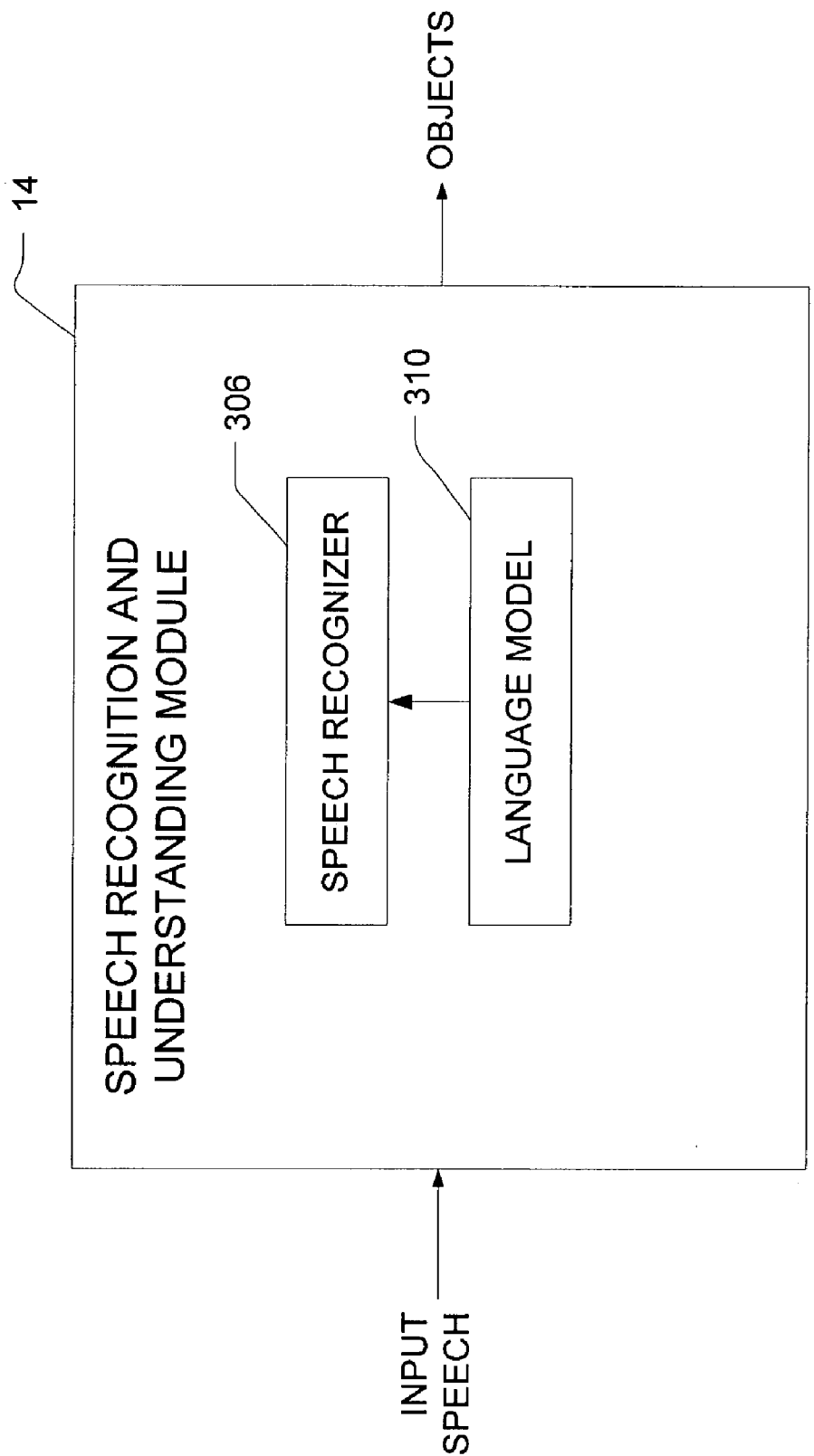
FIG. 7 is a block diagram of a speech recognition and understanding module.

Having described various environments and architectures functioning in system 10, a more detailed description of various components and the function of system 10 is provided. FIG. 7 illustrates a block diagram of speech recognition and understanding module 14. Input speech received from speech interface module 12 is sent to speech recognition and understanding module 14. Speech recognition and understanding module 14 includes a recognition engine 306, which has an associated language model 310. Recognition engine 306 uses language model 310 to identify possible surface semantic structures to represent each of the phrases forming the input, providing partial semantic parses or objects as the input is received. Unlike systems that wait for the user to complete the utterance and then process the complete input received, the module 14 continuously provides semantic objects based only what has so far been received.

Recognition engine 306 provides at least one surface semantic output object based on the partial utterance. In some embodiments, the recognition engine 306 is capable of providing more than one alternative surface semantic object for each alternative structure.

Although illustrated in FIG. 7 wherein speech input is provided, the present invention can be used with handwriting recognition, gesture recognition or graphical user interfaces (where the user interacts with a keyboard or other input device). In these other embodiments, the speech recognizer 306 is replaced with a suitable recognition engine as is known in the art. For graphical user interfaces, a grammar (having the language model) is associated with the user input such as through an input box. Accordingly, a user's input is processed in a consistent way without significant modification based on the manner of input.

The interactive dialog discussed above, which also includes other forms of informative feedback by the system 10 based on partial semantic parses or objects can be implemented using SALT (Speech Application Language Tags) or other speech, handwriting, and pattern recognition APIs (Application Program Interfaces) that support a language model construct that can provide semantic information based on a selected schema for a given application and semantic object synchronous decoding. SALT is a developing standard for enabling access to information, applications and web services from personal computers, telephones, tablet PCs and wireless mobile devices, for example, but can also be applied to application interfaces as well without interconnection across a network. SALT extends existing markup languages such as HTML, XHTML and XML. The SALT 1.0 specification may be found online at http://www.SALTforum.org. It should be noted that SALT can provide semantic information based upon the user's input, for example from speech server 204, which such information forms the objects provided to data rendering module 16 after completion of an utterance; however as discussed further below SALT can be used in manner not previously contemplated to provide partial semantic parses or objects. Use of SALT extensions, or similar extensions in other APIs, provides support for highly interactive event driven user interaction.

Using SALT by way of example, the SALT listen object can be used to perform both speech recognition and understanding tasks. This is because the design follows the viewpoint and formulation that treats speech understanding as a pattern recognition problem, just like speech recognition. Both strive to find a pattern from a collection of possible outcomes that best match a given speech signal. For speech recognition, the pattern to be found is a string of words whereas, for understanding, a tree of semantic objects. A traditional speech recognition task instructs the search process with a language model in composing the likely word strings. In a similar fashion, a speech understanding task can guide the same search engine to compose the suitable semantic object trees with a semantic model. Like a language model that often implies a lexicon and the rules of composing phrase segments from the lexicon entries, a semantic model implies a dictionary of all semantic objects and the rules of composing them. While the recognition outcome is a text string, the understanding result is a tree of semantic objects.

Although it is possible to extend N-gram to return a structured search outcome, most typical speech understanding applications are based on probabilistic context free grammar (PCFG) where the designers can specify rules of composing semantic objects without massive tree-bank annotated training data. One method of specifying such rules is to associate each PCFG rule with production directives for the search engine on how to transform the partial PCFG parse tree into a semantic object tree. An example written in Microsoft Speech Application Interface (SAPI) (which is also an example of a speech API that can be used in the present invention) format is shown below:

```
<rule name="nyc">
  <list>
    <phrase>new york ?city</phrase>
    <phrase>?the big apple</phrase>
  </list>
  <output>
    <city_location>
      <city>New York</city>
      <state>New York</state>
      <country>USA</country>
    </city_location>
  </output>
</rule>
...
<rule name="NewMeeting">
<ruleref min="0" name="CarrierPhrase"/>
<ruleref max="inf" name="ApptProperty"/>
<output>
  <NewMeeting>
    <DateTime>
      <xsl:apply-templates select="//Date"/>
      <xsl:apply-templates select="//Time"/>
      <xsl:apply-templates select="//Duration"/>
    </DateTime>
    <Invitees>
      <xsl:apply-templates select="//Person"/>
    </Invitees>
    ....
  </NewMeeting>
</output>
</rule>
<rule name="ApptProperty"/>
  <list>
    <ruleref name="Date"/>
    <ruleref name="Duration"/>
    <ruleref name="Time"/>
    <ruleref name="Person" max="inf"/>
    <ruleref name="ApptSubject"/>
    .. ..
  </list>
</rule>
.. ..
```

The grammar segment contains three rules. The first one, a pre-terminal named "nyc" lists the expressions for New York City. The <output> tags in this example enclose the rules for constructing semantic objects. They are invoked when the search path exits the grammar node denoted by the token immediately preceding it. In the case, a semantic object, represented in XML with a <city_location> element, is created when a search path exits the "nyc" rule. This semantic object is in turn composed of three semantic objects: the city name, state and country name abbreviations, respectively.

The composition of semantic objects can also be a dynamic process, for example, in scheduling a new meeting. For instance, a NewMeeting semantic object will be produced when the user finishes specifying the meeting properties such as date, time, duration and attendees. Templates can be used to paste other semantic objects as constituents into the NewMeeting semantic object. The same principle can also be applied to other rules not shown here. As an example, an utterance "schedule a meeting with Li Deng and Alex Acero on January first for one hour" will result in the following semantic object:

```
<NewMeeting>
  <DateTime>
    <Date>01/01/2003</Date>
    <Duration>3600</Duration>
  </DateTime>
  <Invitees>
    <Person>Li Deng</Person>
    <Person>Alex Acero</Person>
  </Invitees>
</NewMeeting>
```

In real applications, improving PCFG coverage is a daunting task. It is therefore desirable to be able to use an N-gram to model, among other things, functional phrases that do not carry critical semantic information but usually have sizeable variations in the syntactic structure (e.g., "May I . . . ", "Could you show me . . . ", "Please show me . . . "). In one embodiment, the language model 310 comprises a semantic language model that combines PCFG with N-gram. The technique is slightly different from a unified language model, which can also be used. The unified language model is a natural extension to the conventional class N-gram except it allows CFG fragments, not just a list of words, to be modeled as an individual token in N-gram. The recognizer 306 using this model still produces text string that has to be subsequently parsed. The unified language model thus is designed to incorporate certain linguistic structure to assist text transcription.

The semantic language model, on the other hand, aims at using the decoder or recognizer to search for the semantic structure, which is usually better captured by PCFG. Therefore, instead of embedding CFG fragments into N-gram, the PCFG is used to contain N-gram by creating a special PCFG pre-terminal that corresponds to an N-gram of interests. In Microsoft SAPI grammar format, this can be denoted using a pre-terminal with an XML <dictation> tag, as in $$LCFG<\text{dictation max=``inf''}/>RCFG$$

where LCFG and RCFG denotes the left and right context of the embedded N-gram, respectively. The search process treats the <dictation> tag as a token and expands into the N-gram as if entering a regular non-terminal. The max attribute on the tag specifies the maximum number of words that can be consumed by the N-gram. Inside this N-gram, the word string probability is computed by interpolating the backoff N-gram with the PCFG, more specifically, $$P(w_n | w_{n-1}, w_{n-2}, \ldots) = \lambda P(w_n | Ngram, w_{n-1}, w_{n-2}, \ldots) + \\ (1 - \lambda) P(w_n | RCFG) P(RCFG | w_{n-1}, w_{n-2}, \ldots) \quad (1)$$

where $\lambda$ is the N-gram interpolation weight and $P(RCFG|w_{n-1}, \ldots)$ uses the back-off probability of the N-gram, i.e., $w_n$ is treated as if it is an out of vocabulary word. In one embodiment, the term $P(w_n|RCFG)$ assumes only binary value depending on whether the maximum N-gram word string size is reached and the word is in the coverage of the CFG fragment or not. Since words drawn from PCFG often have a higher probability, paths that really belong to be covered by CFG have tendency to win out their N-gram counterparts even when the maximum N-gram word count is set to infinite. In addition to functional phrases, the embbeded N-gram can also be used to model semantic object with a dictation like property. For example, the meeting subject is model in our task as

```
<rule name="ApptSubject">
<p> <dictation max="inf"/> </p>
```

Further details regarding the semantic language model are described in K. Wang, "Semantic modeling for dialog systems in a pattern recognition framework," in *Proc. ASRU-2001*, Trento Italy, 2001, which is hereby incorporated by reference in its entirety.

A further aspect of the present invention includes a new use of the SALT listen object. SALT provides a set of XML elements, with associated attributes and DOM object properties, events and methods, which may be used in conjunction with a source markup document to apply a speech interface to a source page. In general, the main elements include:

```
<prompt ...>      for speech synthesis
configuration and prompt playing
    <listen ...>      for speech recognizer
configuration, recognition execution and post-
processing, and recording
    <dtmf ...>      for configuration and control of DTMF
    <smex ...>      for general purpose communication with
platform components
The listen and dtmf objects also contain grammar and
binding controls:
    <grammar ...>      for specifying input grammar
resources
    <bind ...>      for processing of recognition results
```

The listen element can include a "mode" attribute to distinguish three modes of recognition, which instruct the recognition server (e.g. 204) how and when to return results. The return of results implies providing the "on Reco" event or activating the "bind" elements as appropriate.

In a first mode, "automatic", the speech platform, rather than the application, is in control of when to stop the recognition process. This mode has been advanced for telephony or hands-free scenarios. As soon as a recognition result is available, and/or where a time period has elapsed indicating silence, the speech platform automatically stops the recognizer and returns its result, which can then be associated with the appropriate field through the bind element.

In a second mode of operation, "single", the return of a recognition result is under the control of an explicit "stop" call. The stop call would correspond to an event such as "pen-up" by the user, and this mode is advanced for being used in a multimodal environment where the device allows speech input, but the user is generally under control of which and when to select fields for example through the use of the stylus 33 (FIG. 1).

A third mode of operation of the speech recognizer is a "multiple mode". This mode of operation is used for an "open-microphone" or in a dictation scenario. Generally, in this mode of operation, recognition results are returned at intervals until an explicit stop call is received or the or other time periods associated with unrecognized input or a maximum time to listen are exceeded. Generally, in this mode of operation, for each phrase that is recognized, a "on Reco" event is issued and the result is returned until the stop ( ) call is received.

However this mode of operation, as another aspect of the present invention, can provide a means for the search engines to expose more interactive capabilities to the users by allowing them to report immediately whenever a salient linguistic landmark is reached. Search algorithms based on time synchronous decoding are well known and can be employed for this mode in a straightforward manner. One such algorithm is described in H. Ney, S. Ortmanns, "Dynamic programming search for continuous speech recognition," *IEEE Signal Processing Magazine*, pp. 64–83, 1999. For speech recognition, the linguistic landmark usually corresponds to a word or a phrase boundary. A SALT multiple mode recognition can therefore be used to display dynamically the word string hypotheses as soon as they are available, a UI effect commonly seen in many commercial dictation software. However, in the present invention, the multiple mode can treat the instantiations of semantic objects as linguistic landmarks and report, i.e. provide some response as a function of what was understood, back to the application on them in a dynamic manner as well. This appears to the application designer as if SALT is performing a semantic object synchronous understanding.

This mode of operation may be better understood by comparing it with a multimodal scenario. In the multimodal scenario, a user indicates a field, for example, by pointing and holding the stylus in an input field while speaking. While the user can tap onto a generic field and utter an elaborated sentence to fill many fields in a single sentence, the tap-and-talk interface nevertheless engages the eyes and hands of the user, a scheme not appropriate for many situations. In addition, although tap-and-talk features a rich back channel communication that displays the volume and a progress bar of the underlying spoken language process, those feedbacks provide only very primitive clues to the quality of the spoken language processing in terms of speed and accuracy. This can be potentially more problematic for longer sentences in which errors can propagate to a wider scope that eventually requires more efforts in merely verifying and correcting the recognition and understanding outcomes. Since the usability studies seem to indicate that long sentences are a key differentiating factor that demonstrates the utility of speech as more than a keyboard enhancement or alternative, a satisfying UI experience is absolutely necessary to the success of using speech as a viable modality.

In order to promote the perception of human-computer as closely collaborative partners in achieving a common goal, semantic object synchronous understanding, by reporting the partial semantic parses or objects as soon as they are available, is effective. In one embodiment, this is achieved by using the multiple mode of the listen element in SALT. In particular, for the listen element a multiple mode is designated and all of the recognition grammars are then specified for the input speech to be recognized. The assignment of results is also specified in the listen object. For example, HTML input code to acquire necessary information, such as date, time, location, subject, and meeting attendees, etc., for creating a new meeting might take the form:

```
<listen mode="multiple" ...>
    <grammar src="subject.grm"/>
    <grammar src="date.grm"/>
    <grammar src="time_duration.grm"/>
    <grammar src="attendees.grm"/>
    <bind targetElement="subject"
        value="//ApptSubject"/>
    <bind targetElement="date"
        value="//DateTime"/>
    <bind targetElement="start_time"
        value="//start_time"
        targetElement="end_time"
        value="//end_time"
        targetElement="duration"
        value="//DateTime/duration"/>
    ...
</listen>
```

The multiple grammars compose a parallel search space for the recognition with a null transition looping back to entry point. In this mode, SALT allows the listen object to raise an event as soon as a grammar is exited. The event forks a parallel process to invoke the bind directives in sequence while the underlying audio collection and recognition are ongoing, thus creating the effect to the user that relevant fields on the form are being filled while a spoken command is still being uttered for an application that has a visual rendering of fields.

For user interface for eyes free applications, accompanied speech outputs might be desired. In that case, SALT prompt objects can be used to give immediate feedbacks. For example, the following SALT prompt object can be used to synthesize response based on the dynamic contents in the date field, and the speech synthesis can be triggered with additional SALT bind directives as follows:

```
<prompt id="say_date">
    on <value targetElement="date"/>
</prompt>
...
<listen ...>
    ...
    <bind targetElement="date"
        value="//date"
        targetElement="say_date"
        targetMethod="Start"/>
    ...
</listen>
```

The net effect is the user feels like he/she is talking to another party that not only jots down but repeats what is heard, as in "Schedule a meeting (new meeting) at two (starting at two o'clock PM) next Tuesday (on 10/29/02) for two hours (duration: two hours)", where the phrases provided in parentheses represent the audible and/or visual prompts (which also can be synchronized) back to the user.

It should be noted that SALT allows designers to attach customized recognition event handlers that perform sophisticated computations beyond the simple assignments as with the SALT bind directives. In the above example, the date normalization can be accomplished in the semantic grammar which, however, cannot facilitate advanced reference resolution (e.g., "Schedule a meeting with Li Deng and his manager"). For such cases, algorithms can be implemented as script objects accessible to proper event handlers to access stored data to ascertain indefinite references. Such algorithms are described in K. Wang, "A plan based dialog system with probabilistic inferences", in *Proc. ICSLP*-2000, Beijing China, 2000 and European Patent Application EP 1199630A2, published Apr. 24, 2002, which are hereby incorporated by reference in their entirety.

It should be noted that although the multiple mode operation existed for the listen object, in current implementations, this mode provides only text for the received input such as in the dictation scenario. However, in this aspect of the present invention, the partial results as input is being received is not only the text, but also includes the corresponding semantic information pertaining to the text, and thus the output comprises partial semantic parses or objects, which can be used as described above to provide the user more quality feedback that the computer has properly understood what has been received. Depending on the sophistication of the application receiving the partial semantic parses or objects, the system can provide back to the user confirmations, alternatives, corrections and clarifications based on the partial semantic parses received.

Although in multimodal applications it is known to include multiple grammars to allow the user to speak ahead, and thereby, provide the ability to provide information that has not been indicated, using the listen element in the multiple mode operation can be better because it provides to the user a higher indication of understanding. In a voice-only application, a natural form of dialog is generated, whereas if using visual renderings are employed, an application can begin processing (taking actions, displaying interim results or options e.g. through pop-up windows) based only on partial semantic parses of what the user has so far provided and while the user continues speaking.

Although the present invention has been described with reference to particular embodiments, workers skilled in the art will recognize that changes may be made in form and detail without departing from the spirit and scope of the invention.

What is claimed is:

1. A speech understanding system comprising:
    a language model comprising a combination of an N-gram language model and a context-free grammar language model, the language model storing information related to words and semantic information to be recognized;
    a module adapted to receive input from a user and capture the input for processing, the module being further adapted to receive SALT application program interfaces pertaining to recognition of the input, the module configured to process the SALT application program interfaces and the input to ascertain semantic information pertaining to a first portion of the input and output a semantic object comprising text and semantic information for the first portion by accessing the language model, wherein performing recognition and outputting the semantic object are performed while capturing continues for subsequent portions of the input.

2. The system of claim 1 wherein the language model comprises a unified language model.

3. The system of claim 1 wherein the language model comprises a semantic language model.

4. The system of claim 1 wherein the module is adapted to identify a listen object of SALT in a multiple mode in order to perform recognition and output the semantic object, while capturing continues for subsequent portions of the input.

5. The system of claim 4 wherein module is adapted to identify grammar objects to define a search space of the language model.

6. The system of claim 1 wherein module is adapted to identify grammar objects to define a search space of the language model.

7. A computer readable media including instructions readable by a computing device which, when implemented, cause the computing device to handle information by performing steps comprising:

receiving input from a user and capturing the input for processing;

receiving SALT application program interfaces to identify a language model to perform recognition and understanding, the language model adapted to provide text of input recognized and semantic information for the input received;

processing the input by accessing the language model to perform recognition on the input to ascertain semantic information pertaining to a first portion of the input and outputting a semantic object comprising text of the recognized input and semantic information for the first portion, wherein performing recognition and outputting the semantic object are performed while capturing continues for subsequent portions of the input.

8. The computer readable media of claim 7 wherein processing includes identifying a listen object of SALT in a multiple mode in order to perform recognition and output the semantic object, while capturing continues for subsequent portions of the input.

9. The computer readable media of claim 8 wherein receiving SALT application program interfaces includes identifying grammar objects to define a search space of the language model.

10. The computer readable media of claim 9 wherein receiving SALT application program interfaces includes identifying grammar objects to define a search space of the language model.

* * * * *